A. NYSTEDT.
STOP COCK FOR CONDUITS AND THE LIKE.
APPLICATION FILED NOV. 8, 1918.
1,315,681. Patented Sept. 9, 1919.
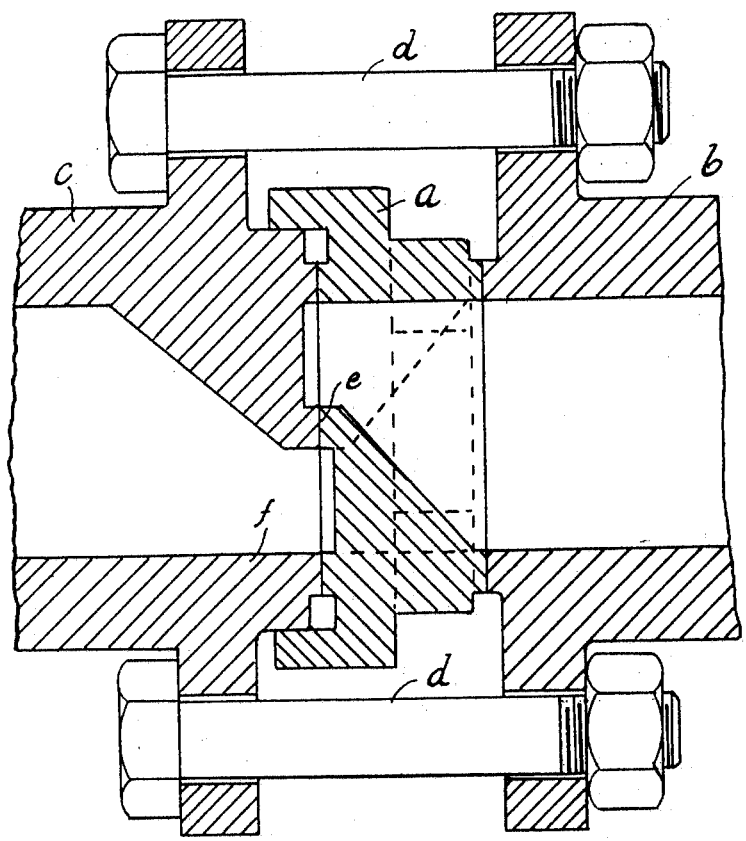
Inventor,
Aksel Nystedt,
By Henry Orth Jr. Atty.

UNITED STATES PATENT OFFICE.

AKSEL NYSTEDT, OF STABAEK, NEAR CHRISTIANIA, NORWAY, ASSIGNOR TO NORSK HYDRO-ELEKTRISK KVAELSTOFAKTIESELSKAB, OF CHRISTIANIA, NORWAY.

STOP-COCK FOR CONDUITS AND THE LIKE.

1,315,681.      Specification of Letters Patent.      Patented Sept. 9, 1919.

Application filed November 8, 1918. Serial No. 261,619.

*To all whom it may concern:*

Be it known that I, AKSEL NYSTEDT, subject of the King of Norway, of Stabaek, near Christiania, Norway, have invented certain new and useful Improvements in Stop-Cocks for Conduits and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to the type of stop cocks for conduits and the like, which comprise a rotary disk valve interposed between the tube ends and adapted to be operated from outside.

The object of the invention is to provide a valve of this type, which is simple in construction, and which is particularly adapted for conduits of fragile materials such as earthen-ware and the like.

According to the present invention one of the tube ends between which the rotary disk valve is interposed is provided with a circular normal opening, whereas the other tube end has a restricted preferably semicircular opening.

It will be understood that under the above conditions the conduit will be open, when the semicircular openings in the rotary disk valve and other tube end correspond, while the conduit is closed when the semicircular opening of the disk valve is covered by the closed half of the said tube end.

An embodiment of the invention is illustrated on the accompanying drawings, which shows an axial section of the same.

The cock comprises a rotary disk valve $a$ interposed between the two tube members $b$, $c$. The tightening surfaces are plane and parallel, so that no sticking of the valve can take place. Also risk of breakage of the body is avoided. The sleeve valve may however also be provided with conical tightening surfaces.

When the cock is to be opened or closed the rotary sleeve valve $a$ is turned, the flange $f$ on the valve serving to maintain the latter in position during the turning moment. In the position illustrated on the drawing the diametrical tightening surfaces $e$ cover each other, and the cock is closed. When the cock is rotated one half turn, the tightening surfaces $e$ will again cover each other but the cock will then be in the position indicated in dotted lines and leave a free passage for the medium passing through the conduit. The guiding flange $f$ on member $a$ may be integral with or separated from the same.

Said guiding flange $f$ may preferably be provided with holes or surfaces adapted to be engaged by a wrench or key but obviously also other means for rotating the disk may be employed.

The tightening pressure may be obtained by means of screw bolts such as $d$ extending between the flanges of members $b$, $c$, said flanges serving also for connecting the cock to the conduit.

Instead of mounting the cock directly between the tube ends $b$, $c$, as illustrated on the drawing, it will be understood, that the cock may also be manufactured as an independent unit comprising the rotating sleeve $a$ as well as the members $b$, $c$, and also in this case the cock may be connected to the tube ends by means of screw bolts passing through the same flanges, which serve to connect members $b$, $c$.

I claim:

In a stop-cock for conduits, pipes, and the like, a rotary disk valve interposed between two co-axial tube ends, a cylindrical flange on one end of said valve inclosing the free end of one tube, a semi-circular opening in said valve, and a corresponding semi-circular opening in the said tube end, the opposite tube end having a normal end opening.

In testimony that I claim the foregoing as my invention, I have signed my name in presence of two subscribing witnesses.

AKSEL NYSTEDT.

Witnesses:
   MOGEUS BUGGER,
   ELISE PAULLSON.